United States Patent
Wu et al.

(10) Patent No.: US 10,416,339 B2
(45) Date of Patent: *Sep. 17, 2019

(54) HOMOGENEOUS INVERSION FOR MULTI-COMPONENT INDUCTION TOOLS

(71) Applicant: Halliburton Energy Services, Inc., Houston, TX (US)

(72) Inventors: Dagang Wu, Katy, TX (US); Luis Emilio San Martin, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 168 days.

This patent is subject to a terminal disclaimer.

(21) Appl. No.: 14/890,390

(22) PCT Filed: Sep. 10, 2013

(86) PCT No.: PCT/US2013/059016
§ 371 (c)(1),
(2) Date: Nov. 10, 2015

(87) PCT Pub. No.: WO2015/038099
PCT Pub. Date: Mar. 19, 2015

(65) Prior Publication Data
US 2016/0084983 A1    Mar. 24, 2016

(51) Int. Cl.
*G01V 3/38* (2006.01)
*G01V 3/10* (2006.01)
*G01V 3/28* (2006.01)

(52) U.S. Cl.
CPC ............... *G01V 3/38* (2013.01); *G01V 3/104* (2013.01); *G01V 3/108* (2013.01); *G01V 3/28* (2013.01)

(58) Field of Classification Search
None
See application file for complete search history.

(56) References Cited

U.S. PATENT DOCUMENTS 6,574,562 B2   6/2003   Tabarovsky et al.
7,076,370 B1   7/2006   Freedman et al.
(Continued)

FOREIGN PATENT DOCUMENTS

WO   WO-2011091216 A2   7/2011
WO   WO-2012102705 A1   8/2012
(Continued)

OTHER PUBLICATIONS

Alexopoulos EC, Introduction to Multivariate Regression Analysis, Hippokratia 2010, 14 (Suppl 1): 23-2.*

(Continued)

*Primary Examiner* — Tung S Lau
(74) *Attorney, Agent, or Firm* — Gilliam IP PLLC

(57) ABSTRACT

Various embodiments include apparatus and methods that perform a homogeneous inversion processing to data or signals acquired from a multicomponent induction tool operating in a wellbore. The homogeneous inversion processing can be used to provide a quality check of results from radial one dimensional borehole correction processing. Also, the homogeneous inversion processing may be employed as a dip indicator of conventional array induction logging processing. Additional apparatus, systems, and methods are disclosed.

30 Claims, 10 Drawing Sheets

(56) References Cited

U.S. PATENT DOCUMENTS

| | | | |
|---|---|---|---|
| 7,386,430 B2 | 6/2008 | Barber et al. | |
| 9,482,775 B2* | 11/2016 | Wu | G01V 1/42 |
| 9,611,731 B2* | 4/2017 | Hou | E21B 47/022 |
| 2006/0132138 A1* | 6/2006 | Pelegri | G01V 3/28 324/339 |
| 2011/0231098 A1* | 9/2011 | Omeragic | G01V 3/28 702/7 |
| 2013/0080058 A1* | 3/2013 | Wu | G01V 1/42 702/7 |
| 2016/0011327 A1* | 1/2016 | Wu | G01V 3/28 702/7 |
| 2016/0047239 A1* | 2/2016 | Hou | E21B 47/12 702/7 |

FOREIGN PATENT DOCUMENTS

| | | |
|---|---|---|
| WO | WO-2013036509 A1 | 3/2013 |
| WO | WO-2013066297 A1 | 5/2013 |
| WO | WO-2015038099 A1 | 3/2015 |

OTHER PUBLICATIONS

C. Vrettos, Simple inversion procedure for shallow seismic refraction in continuously nonhomogeneous soils, Apr. 2, 1996, 6 pages.*

Andreas Englert, Comparison of smoothness-constrained and geostatistically based cross-borehole electrical resistivity tomography for characterization of solute tracer plumes, Jan. 18, 2017, pp. 274-286.*

"International Application Serial No. PCT/US2013/059016, International Search Report dated May 27, 2014", 3 pgs.

"International Application Serial No. PCT/US2013/059016, Written Opinion dated May 27, 2014", 9 pgs.

GCC Application Serial No. GC 2014-27871, Examination Report; dated Oct. 30, 2017; 6 pgs.

"Australian Application Serial No. 2013400142, First Examiner Report dated Apr. 22, 2016", 2 pgs.

"European Application Serial No. 13893443.5, Office Action dated Feb. 17, 2016", 2 pgs.

"European Application Serial No. 13893443.5, Response filed Aug. 12, 2016 to Office Action dated Feb. 17, 2016", 10 pgs.

* cited by examiner

HOMOGENEOUS INVERSION FOR MULTI-COMPONENT INDUCTION TOOLS

PRIORITY APPLICATION

This application is a U.S. National Stage Filing under 35U.S.C. 371 from International Application No. PCT/US2013/059016, filed 10 Sep. 2013; and published as WO 2015/038099 on 19 Mar. 2015; which application and publication are incorporated herein by reference in their entirety.

TECHNICAL FIELD

The present invention relates generally to apparatus, systems, and methods related to oil and gas exploration and production.

BACKGROUND

In drilling wells for oil and gas exploration, understanding the structure and properties of the associated geological formation provides information to aid such exploration. Measurements in a wellbore, also referred to as a borehole, are typically performed to attain this understanding. However, the environment in which the drilling tools operate is at significant distances below the surface and measurements to manage operation of such equipment are made at these locations.

Logging is the process of making measurements via sensors located downhole, which can provide valuable information regarding the formation characteristics. For example, induction logging can utilize electromagnetic signals that can be used to make measurements. The responses from probing with electromagnetic signals can provide logs that represent measurements of one or more physical quantities in or around a well, where these measurements are a function of depth, time, or depth and time. The usefulness of such measurements may be related to the precision or quality of the information derived from such measurements. On-going efforts are being directed to improving techniques to enhance the precision or the quality of the information derived from such measurements using logging tools.

DETAILED DESCRIPTION

Figure 1:
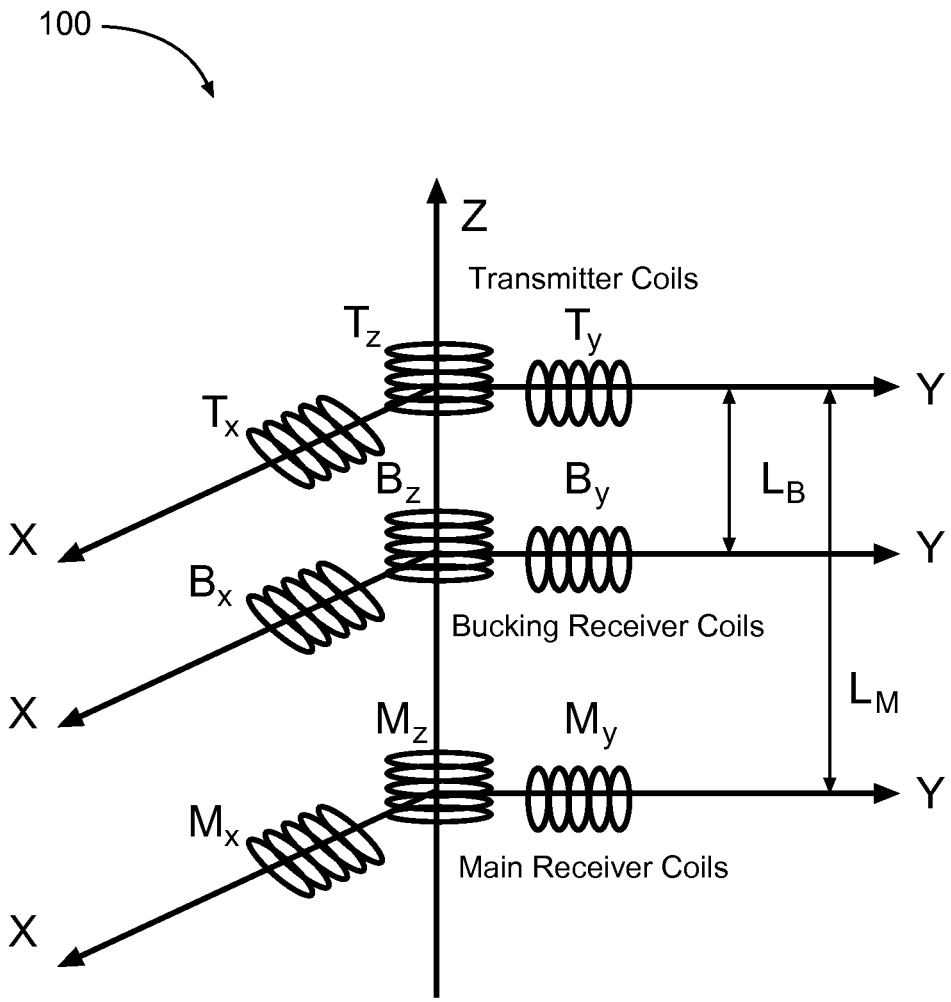
FIG. 1 shows an example multi-component induction (MCI) tool that can be employed as a logging tool to provide measurement signals for use in processing techniques, in accordance with various embodiments.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Multi-coupling-component signals of electromagnetic (EM) resistivity logging tools are widely used to explore formation parameters, such as formation anisotropy, relative dip angle, boundaries, etc. Inversion processing of data to determine formation parameters can be performed according to a modeling approach for the formation. Inversion operations can include a comparison of measurements to predictions of a model such that a value or spatial variation of a physical property can be determined. In inversion, measured data may be applied to construct a model that is consistent with the data. For an examination process, an inversion operation can include determining a variation of electrical conductivity (resistivity) in a formation from measurements of induced electric and magnetic fields. Other techniques, such as a forward model, deal with calculating expected observed values with respect to an assumed model.

In zero-dimensional (0D) inversion, there is no variation in the formation, such as in a homogenous formation. In one-dimensional (1D) modeling, there is variation in one direction such as a formation of parallel layers. In two-dimensional (2D) modeling, there is variation in two directions and, in three-dimensional (3D) modeling, there is variation in three directions. In general, a coordinate system in which the above dimensions are defined can be Cartesian or cylindrical. In borehole applications, a cylindrical coordinate system is often used.

In general, 0D inversion is attractive owing to its simplicity and fast computation. Several processing schemes have been proposed on the basis of 0D inversion using various coupling components to calculate formation parameters. Based on distinct sensitivities of these coupling components, 0D inversion is able to provide accurate inverted formation model at arbitrary wellbore inclinations, especially while the EM tool is located in a thick bed. Processing schemes have provided successful determination of anisotropy parameters, which may include horizontal resistivity, vertical resistivity, relative dip angle, and relative strike, presented by both synthetic responses and field data. A synthetic response is a modeled response of a tool with respect to known parameters of the formation to which the tool is being applied. The synthetic response can be created by numerically modeling the interaction of the tool and the formation, usually involving simulation. In a synthetic log, simulation may be conducted for each depth of the log on a point by point basis.

The algorithms for the processing of multi-component induction (MCI) data form a complicated system with the processing steps strongly interconnected. In other words, quality of a processing step will influence next processing steps. The processing of MCI data can be realized in instrumentality, portions of which may be described in terms of algorithms and symbolic representations of operations on data bits within a machine memory. An algorithm is herein, and generally, conceived to be a self-consistent sequence of steps leading to a desired result. The steps are those requiring physical manipulations of physical quantities. Usually, though not necessarily, these quantities take the form of structures, controlled by electrical, magnetic, or optical signals, capable of being stored, transferred, combined, compared, and otherwise manipulated. The instrumentality may operate to process, compute, calculate, determine, display, and/or conduct other activities correlated to processes of a machine such as a computer system, or similar electronic computing device, that manipulates and transforms data represented as physical quantities within the machine's registers and memories into other data similarly represented as physical quantities within machine memories or registers or other such information storage devices.

In various embodiments, a homogeneous inversion processing is applied to data collected from a MCI tool. The homogeneous inversion processing can be used to provide quality checking of results from radial one dimensional borehole correction (Radial1D/BHC) processing. Also, the homogeneous inversion processing can be employed as a dip indicator of conventional array induction logging processing.

FIG. 1 shows an example of an embodiment of a MCI tool 100 that can be employed as a logging tool to provide measurement signals for use in processing techniques disclosed herein. The MCI tool 100 includes a triad of transmitter coils oriented along x-, y-, and z-directions and a triad of receiver coils with similar orientations. The receiver coils are used to collect electromagnetic signals from surrounding formation that is excited by the transmitter coils. In a traditional induction logging tool, in order to remove the signal that goes directly from the transmitter to the receiver and obtain a better measurement of the formation response, the receiver is made of two functional parts. The two functional parts include main receiver coils and bucking receiver coils. The main receiver coils can be separated from the transmitter coils by a distance $L_M$ and the bucking receiver coils can be separated from the transmitter coils by a distance $L_B$, where $L_M$ is typically but not necessarily greater than $L_B$.

Figures 2A, 2B:
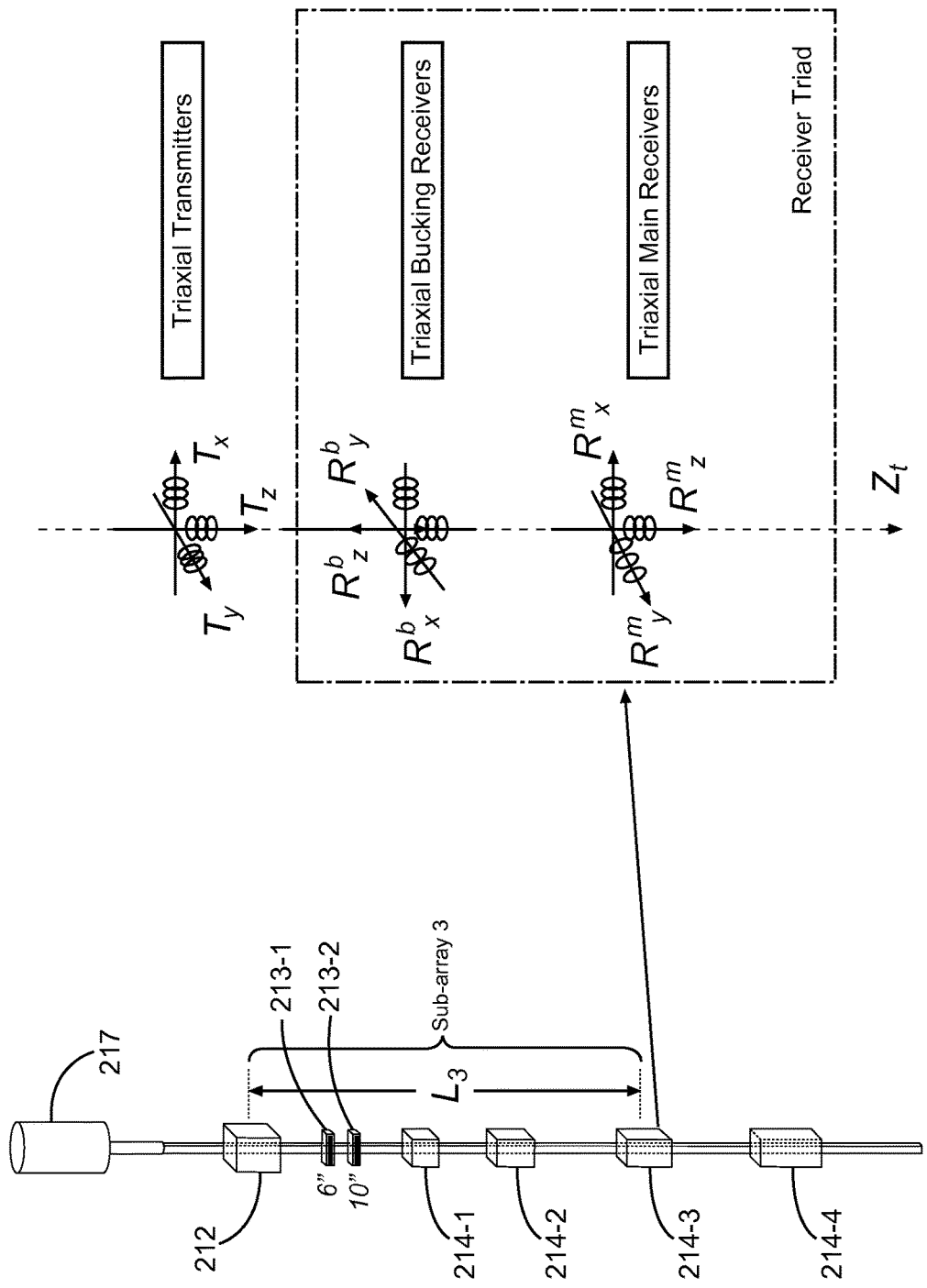
FIG. 2A illustrates an example tool structure of a MCI tool, in accordance with various embodiments.
FIG. 2B illustrates a configuration of one subarray of the MCI tool of FIG. 2A, in accordance with various embodiments.

FIG. 2A illustrates an example tool structure of a MCI tool. The MCI tool can include a transmitter triad 212, four receiver triads 214-1, 214-2, 214-3, and 214-4, as well as two conventional axial receivers 213-1 and 213-2. An MCI tool can include transmitter triads, receiver triads, and conventional axial receivers different in number from the numbers shown in FIG. 2A. The conventional receivers can be located closest to the transmitter triad. The receivers are separated from the transmitter triad. For example, one conventional axial receiver 213-1 can be separated from the transmitter triad by 6 inches and the second conventional axial receiver 213-2 can be separated from the transmitter triad 212 by 10 inches. FIG. 2A shows the receiver triad 214-3 separated from the transmitter triad by a distance $L_3$. The other receiver triads are separated from the transmitter triad by different distances. A MCI tool can be structured with a number of different sets of separation distances.

The MCI tool can include an electronic housing 217. The electronic housing 217 can include a control unit to selectively activate the transmitter triad 212 and to selectively acquire signals from the receiver triads 214-1, 214-2, 214-3, and 214-4, and the conventional axial receivers 213-1 and 213-2 in response to a probe signal transmitted from the transmitter triad 212. The electronic housing 217 can include a processing unit to operate on the received signals. The processing unit of the electronic housing 217 may also be arranged to process MCI data derived from the received signals in a manner similar to or identical to techniques taught herein.

FIG. 2B illustrates a typical configuration of one subarray of the MCI tool of FIG. 2A, which can be selectively controlled to acquire a response at one frequency. FIG. 2B shows an equivalent dipole model of the one subarray arranged as a triad. It can be structured with triaxial components including the three mutually orthogonal transmitters ($T_x$, $T_y$, $T_v$), the three mutually orthogonal main receivers ($R^m_x$, $R^m_y$, $R^m_x$) and three mutually orthogonal bucking/balancing receivers ($R^b_x$, $R^b_y$, $R^b_z$). The receiver triad 214-3 can include the main receivers ($R^m_x$, $R^m_y$, $R^m_z$) along with the bucking/balancing receivers ($R^b_x$, $R^b_y$, $R^b_z$). In this example, the transmitters are structured as transmitter coils that are collocated. The main receivers can be structured as receiver coils that are collocated, and the bucking receivers can be structured as receiver coils that are collocated.

Figure 3:
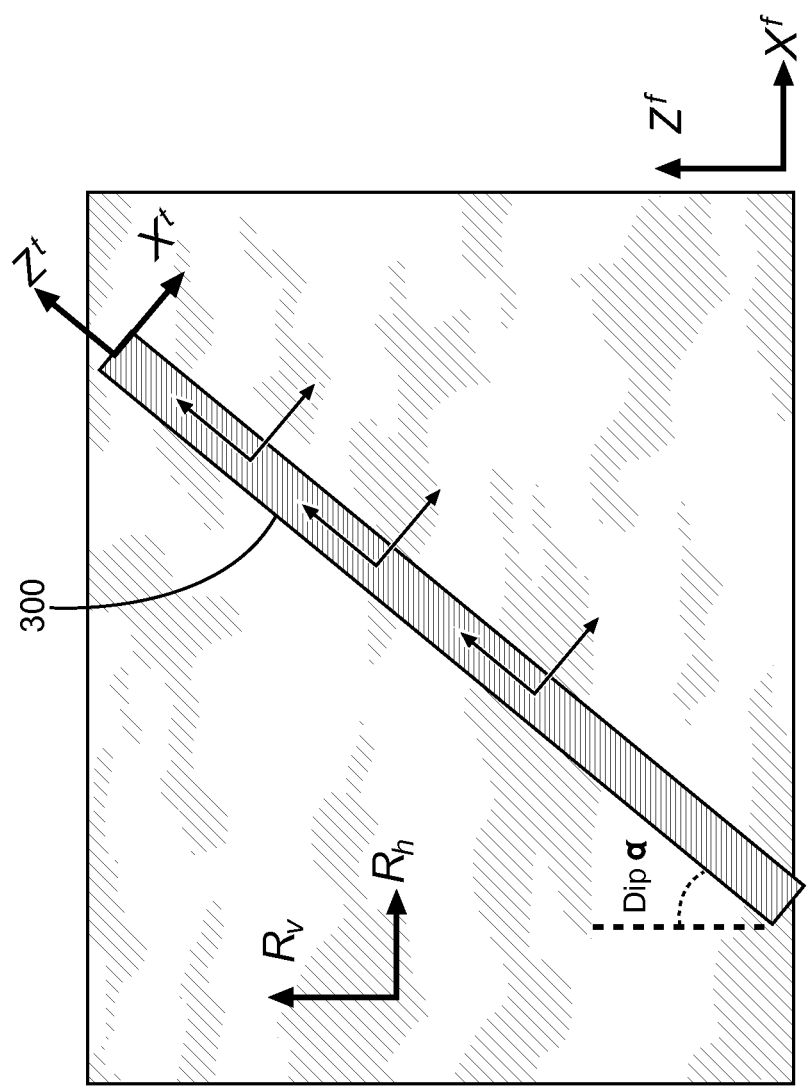
FIG. 3 illustrates a representation of a formation model, in accordance with various embodiments.

FIG. 3 illustrates a representation of a formation model. A homogeneous inversion processing can be applied to solve for a homogeneous transverse-isotropic formation model. As shown in FIG. 3, horizontal resistivity (Rh), vertical resistivity (Rv), and relative dip angle are unknowns to be solved using a tool 300. To solve this inversion problem, an iterative scheme can be used to calculate these formation parameters via analytical formulations. See, for example, international publication WO 2013/015789 A1. Using a nonlinear least square method to iteratively update formation model by reducing the misfit between measurement data and simulated data is another feasible approach.

Figure 4:
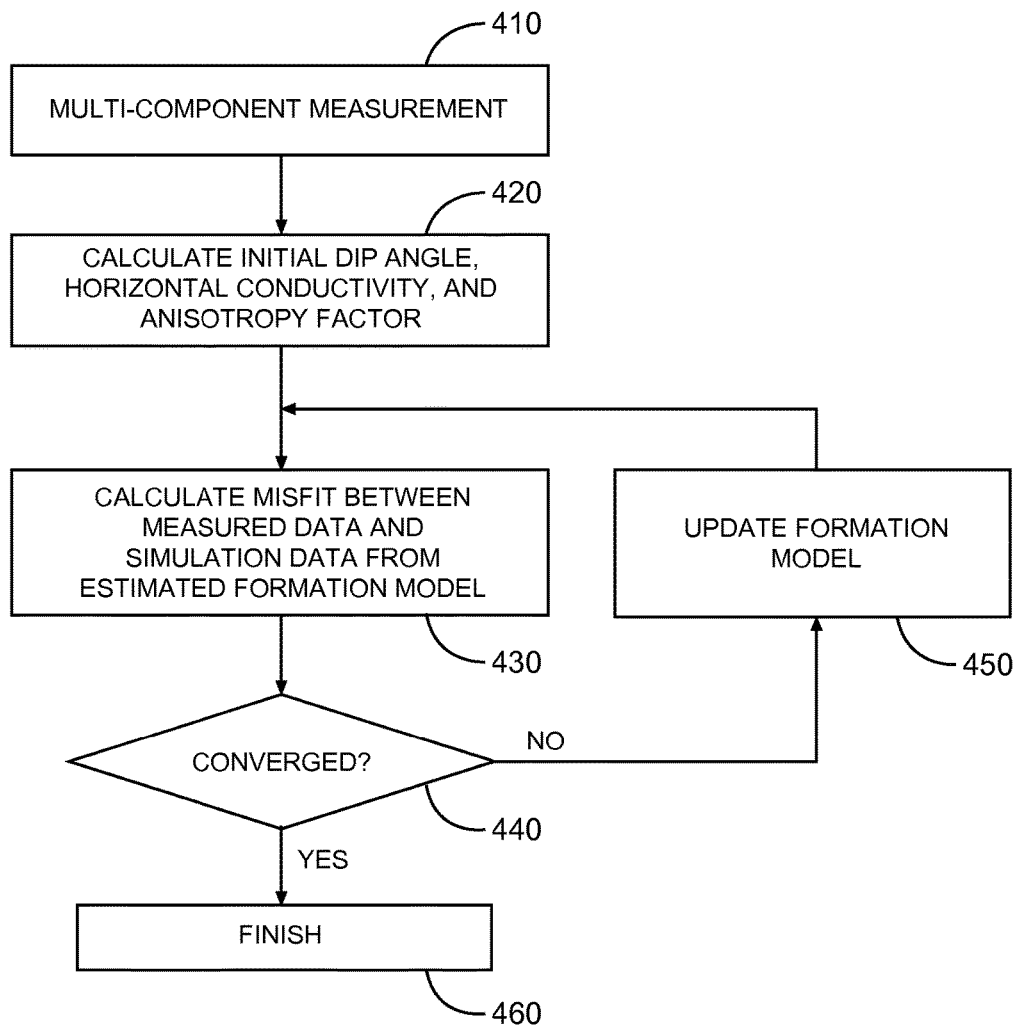
FIG. 4 illustrates a generalized homogeneous inversion workflow, in accordance with various embodiments.

FIG. 4 illustrates a generalized homogeneous inversion workflow. At 410, measurement is made using a MCI tool. At 420, initial dip angle, horizontal conductivity, and anisotropy factor are calculated. Other initial parameters can be calculated. At 430, misfit between measured data and simulation data from an estimated formation model is calculated. At 440, a determination is made as to whether there is convergence. Convergence can be evaluated as the misfit being less than a set threshold. If there is no convergence, the formation model is updated at 450 and the procedure returns to calculation of misfit at 430. Various schemes can be applied to update the formation model. If there is convergence, the inversion is finished at 460. These approaches are computationally fast and can be implemented in real-time due to the fact that forward modeling of a homogeneous transverse-isotropic formation can be simulated extremely fast.

Figure 5:
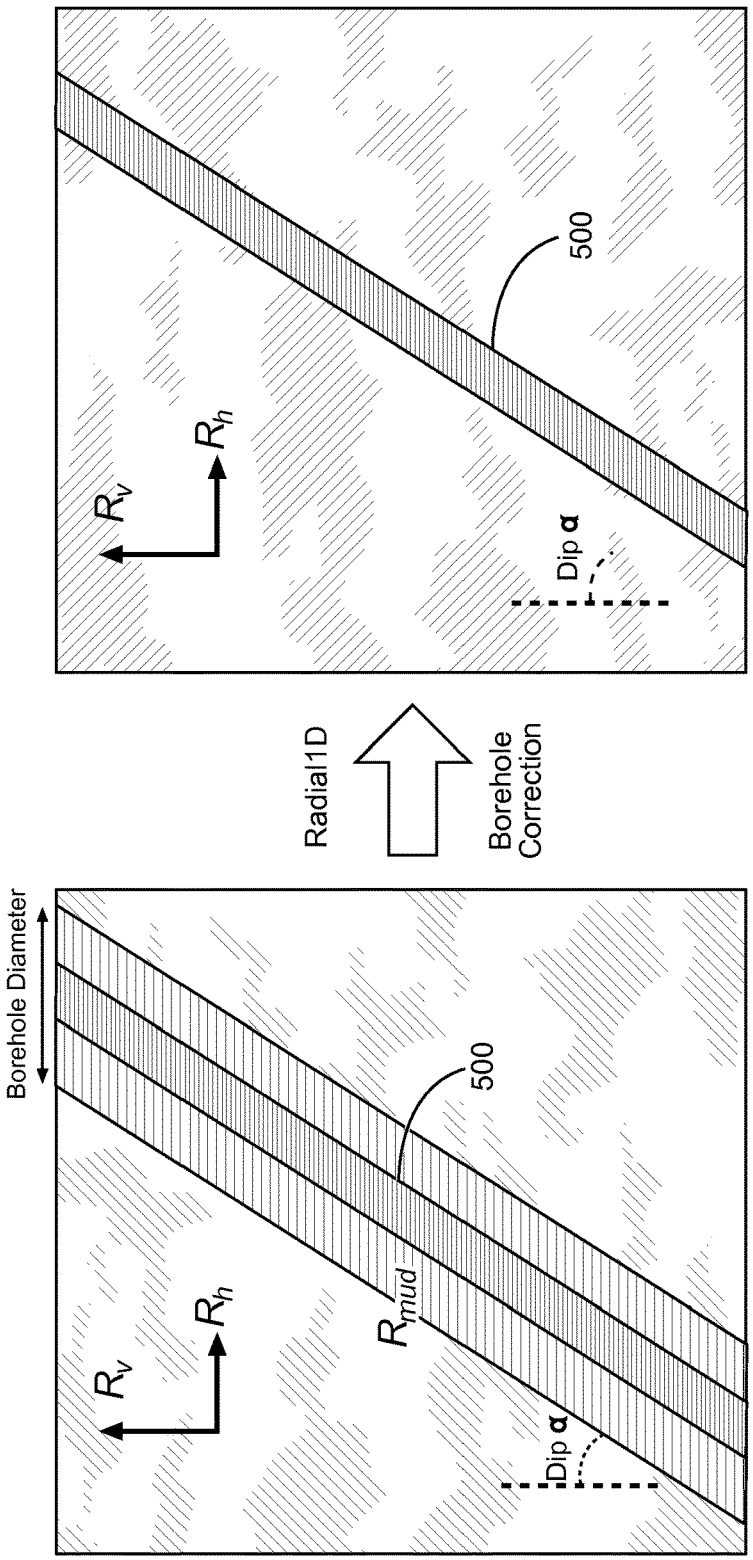
FIG. 5 illustrates a fundamental scheme of general radial one dimensional borehole correction processing, in accordance with various embodiments.

Homogenous Inversion can be used for quality control of Radial1D/BHC processing. The fast processing method that was described above assumes no borehole is present. However, in reality, measurements are taken from a borehole that may affect the results. To remove borehole effect from logging measurement results, Radial1D/BHC processing can be employed. See, for example, international publication WO 2013/066297 A1. As a result, data processed by Radial1D/BHC should closely match with the behavior of a homogenous formation model. FIG. 5 illustrates a fundamental scheme of a general Radial1D/BHC with respect to tool 500.

Theoretically, if the data is noise-free and the shoulder bed effect is not strong, formation properties (Rh, Rv, and Dip) calculated from Radial1D/BHC processing should be close to formation properties (Rh, Rv, and Dip) computed from homogenous/0D inversion of borehole-corrected data. The disagreement between these two results implies that there are possible failures associated with Radial1D/BHC processing, possible measurement issues, or presence of a complex formation model (non-planar, cross-bedding, fractures, and invasion effect). A MCI tool, such as shown in FIGS. 1, 2A, and 2B can be operated at multiple frequencies. Performance of the different frequency channels can vary due to various reasons, for example inaccurate calibration, measurement instability, unfavorable signal to noise ratio, etc. Use of an MCI tool can include a multiple array tool, such as in FIGS. 2A and 2B. Performance of different arrays may also vary due to various reasons.

Results from different frequency and array measurements are a function of resistivity distribution around the tool and, as a result, they can vary from situation to situation. However, due to presence of certain patterns and statistical distribution in the formation characteristics, some common patterns and/or statistical distributions can be observed in the measured tool responses. These patterns may be used to produce a quality control metric that can determine whether or not the inversion results are reliable. One way to achieve this determination includes modeling with a formation model that incorporates a wide range of formation contrasts that can be observed in real measurements and then evaluate the synthetic responses to capture these patterns. Another approach is to evaluate actual data collected from the tool. These patterns can be stored in database and a statistical correlation between the formation with a borehole, shown on the left in FIG. 5, and the formation without the borehole, shown on the right in FIG. 6, can be generated.

A metric can include intra-frequency and intra-array comparison. As an example, by comparing homogenous/0D inversion results from different arrays with Radial1D/BHC inversion results from different arrays, the data quality can be evaluated. Each array's logging data, at every frequency channel, that shows reasonable agreement between these two processing methods, can be selected for further processing. Reasonable agreement can be assessed by determining whether the values from the two processing methods are within a selected error or threshold range. Therefore, the final processing results, to be generated for storage in a database and/or on a display vehicle, can be optimally selected after quality examination by homogenous/0D inversion. These processing results can include an ordering of the spacing of transmitter to receiver array with respect to quality of measurement based on comparison of metrics correlated to the receiver arrays. These processing results can include an ordering of the operational frequencies with respect to quality of measurement based on comparison of metrics correlated to the operational frequencies.

Figure 6:
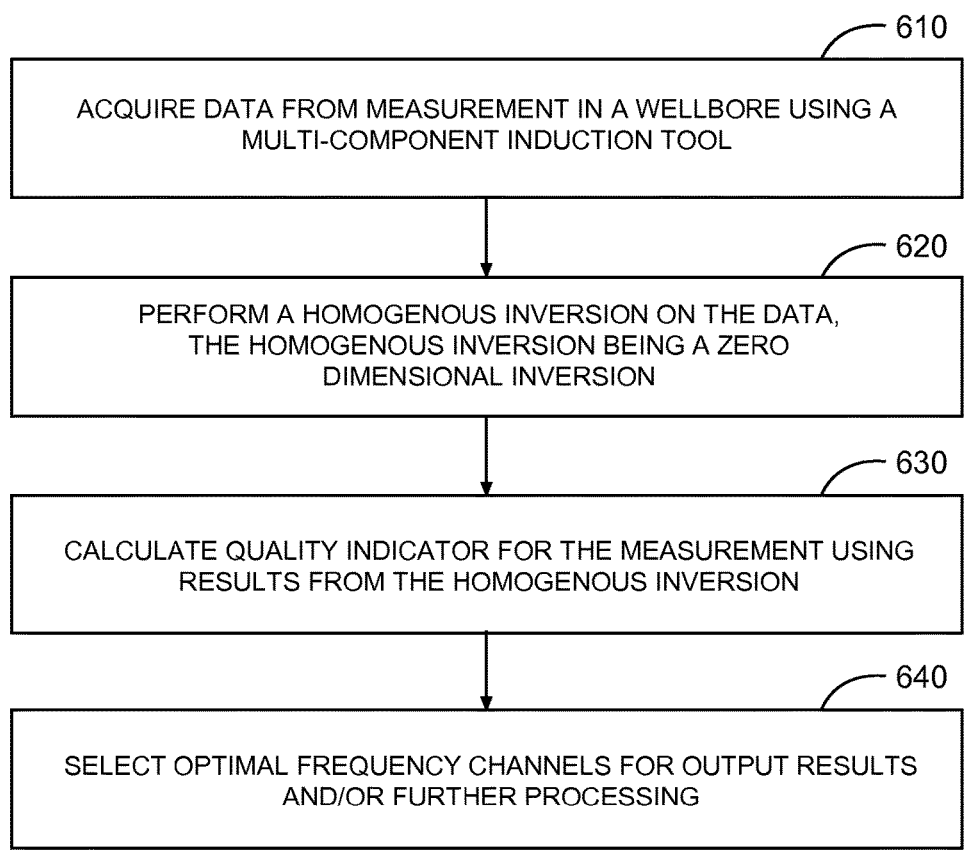
FIG. 6 shows features of an example application of homogenous inversion on data from a MCI tool, in accordance with various embodiments.

FIG. 6 shows features of an embodiment of an example application of homogenous inversion on data from a MCI tool. At 610, data is acquired from measurement in a wellbore using a MCI tool. At 620, a homogenous inversion is performed on the data, the homogenous inversion being a zero dimensional inversion. At 630, a quality indicator for the measurement is calculated using results from the homogenous inversion. A quality indicator may be calculated from every measurement taken. At 640, optimal frequency channels are selected for output results and/or further processing.

A metric can include evaluating differences between radial one-dimensional (R1D) inversion and 0D inversion. If the tool making an accurate measurement and the true formation matches the model used in processing, which is typically homogeneous parallel layers with no cross-bedding, 0D result should match the results from R1D. Any deviation would indicate a problem with measurement quality or complex formation characteristic. Evaluating differences between R1D inversion and 0D inversion can be extended to evaluating differences in anisotropy ratio, dip angle, strike angle from R1D inversion and 0D inversion.

A metric can include evaluating 0D range limits. The 0D resistivity result that the tool produces for a given frequency or array can provide another criterion. Resistivity readings higher than a certain number are usually not reliable due to inductive nature of the MCI tool. A threshold for the range limit can be taken from the specification of the tool or based on a more detailed study that incorporates effects of local or statistical anisotropy ratio, anisotropy direction, layering, and invasion characteristics of the log.

A metric can include generating a sensitivity and a uniqueness calculation. The quality and uncertainty of the results can be tested automatically by injecting noise to the input of the 0D inversion and analyzing the variations in the 0D inversion results, which can provide a quantification of the sensitivity of the measurements. The degree of variations can be assessed to indicate the quality of anisotropy results (horizontal resistivity, vertical resistivity, dip, strike) individually. The injected noise can be chosen as the best model of the errors in the tool measurements. The noise can include measured noise related to the electronics and sensors of the measurement arrangement. The noise can include effects of imperfections of the model employed. The injected noise is a selectable amount that can be set to include individual noise or error sources or combinations of such sources. Noise magnitudes can be chosen same with the maximum tolerable error in the tool specifications. The injected noise can be set to levels used in previous R1D processing. This analysis based on 0D is expected to be faster than R1D, since it does not involve a large database or multiple layer inversion. The sensitivity results can be applied to generation of a quality factor for quality control. For example, only those measurements with a sensitivity within a selected range may be used for further quality metric calculations.

Figure 7:
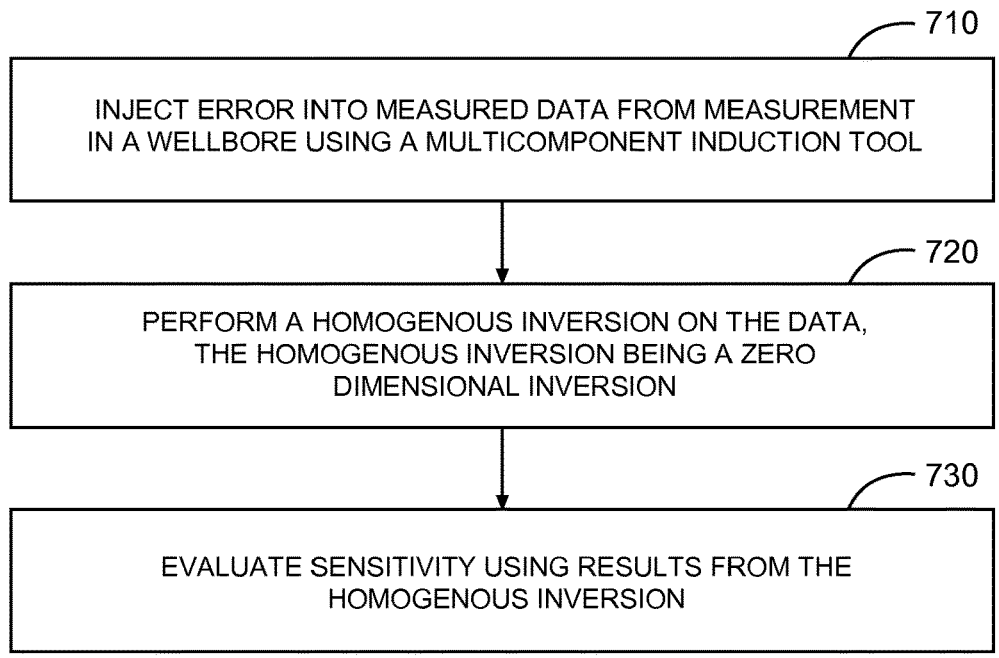
FIG. 7 shows features of an example application of homogeneous inversion on data from a MCI tool, in accordance with various embodiments.

FIG. 7 shows features of an embodiment of an example application of homogenous inversion on data from a MCI tool. At 710, error is injected into measured data from measurement in a wellbore using a MCI tool. At 720, a homogenous inversion is performed on the data, the homogenous inversion being a zero dimensional inversion. At 730, sensitivity is evaluated using results from the homogenous inversion.

The various metrics, discussed herein, can be extended to anisotropy ratio, dip angle, and strike angle. The following equations provide an example technique that can be used to quantify the quality examination. It should be noted that since longer arrays usually suffer more from shoulder bed effect, different threshold values may be applied to different arrays.

$$Quality_{Rh} = \begin{cases} \text{Uncertain,} & R_h^{Radial1D} > SpecifiedUpperLimit \\ \text{Good,} & \frac{|R_h^{Radial1D} - R_h^{0D}|}{R_h^{0D}} < threshold_{Rh} \\ \text{Questionable,} & \text{else} \end{cases}$$

$$Quality_{Rv} = \begin{cases} \text{Uncertain,} & R_v^{Radial1D} > SpecifiedUpperLimit \\ \text{Good,} & \frac{|R_v^{Radial1D} - R_v^{0D}|}{R_h^{0D}} < threshold_{Rv} \\ \text{Questionable,} & \text{else} \end{cases}$$

$$Quality_{Dip} = \begin{cases} \text{Uncertain,} & R_h^{Radial1D} > SpecifiedUpperLimit \\ & \text{or } R_v^{Radial1D} > SpecifiedUpperLimit \\ & \text{or } \frac{R_v^{Radial1D}}{R_h^{Radial1D}} < threshold_{ratio} \\ \text{Good,} & |Dip^{Radial1D} - Dip^{0D}| < threshold_{Dip} \\ \text{Questionable,} & \text{else} \end{cases}$$

The region identified as uncertain is correlated to a specified upper limit. The specified upper limit may be a tool-specified limit indicating the dynamic range to which the tool can be used. This tool-specified limit may be provided by the specifications of the tool or components of the tool. In the region identified as being questionable, there is an issue as to the processing, since the measurements are within the dynamic range of the tool being used. In the region identified as being good, the quality factor can be generated as a numerical value that quantifies the quality of the measurements. A higher quality measurement may correspond to a smaller difference between homogenous inversion and Radial1D/BHC. Using a ratio provides a normalization to the quality factor for the given parameter of interest. Other numerical relationships may be generated to define a metric for a parameter under consideration. The format of such a metric depends on the parameter being evaluated with respect to quality. Other parameters can include anisotropy ratio, dip angle, strike angle, and other parameters generated by downhole measurements. Each of the metrics can be related to differences between the homogenous inversion and R1D inversion and/or Radial1D/BHC inversion.

In various embodiments, homogenous inversion can be used as a dip indicator. Conventional array induction logging processing can be applied to a MCI tool, such as the MCI tools of FIGS. 1, 2A, and 2B. Usually, conventional array induction logging processing delivers accurate horizontal resistivity when the relative dip angle is not very high. At higher relative dip angle, effect of vertical resistivity and shoulder beds increase. As a result, conventional array induction logging processing should be modified or corrected.

Homogenous/0D inversion processing can provide dip angles of formations and it is a relatively fast processing method. Homogenous/0D inversion processing can be readily used as a dip indicator for conventional array induction logging processing. When the relative dip estimated by homogenous/0D inversion processing is larger than a pre-defined threshold value, additional processing method can be applied to improve the conventional array induction logging processing results. Otherwise, no additional processing is required on conventional array induction logging processing results.

$$Indicator_{Dip} = \begin{cases} HighDip, & Dip^{0D} > threshold_{Dip}^{indicator} \\ LowDip, & \text{else} \end{cases}$$

Figure 8:
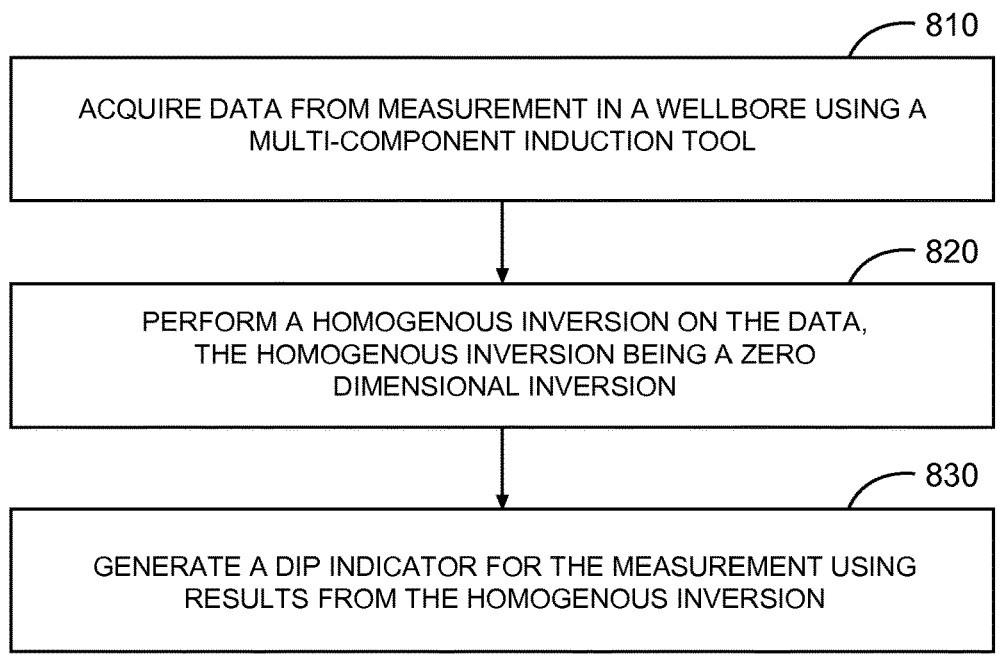
FIG. 8 shows features of an example application of homogenous inversion on data from a MCI tool, in accordance with various embodiments.

FIG. 8 shows features of an embodiment of an example application of homogenous inversion on data from a MCI tool. At 810, data is acquired from measurement in a wellbore using a MCI tool. At 820, a homogenous inversion is performed on the data, the homogenous inversion being a zero dimensional inversion. At 830, a dip indicator for the measurement is generated using results from the homogenous inversion.

Homogeneous inversion processing can be applied to examine quality of Radial1D/BHC processing of MCI tools. The homogeneous inversion processing methods, similar or identical to methods taught herein, can be used to evaluate the quality of Radial1D/BHC processing by using homogeneous inversion processing results to quantify quality of Radial1D/BHC processing. In addition, optimal frequency channel can be selected for each array of a multi-array tool based on quality evaluation results. A single frequency channel or a combination of several frequency channels can be optimally selected for each array at each logging point. Using techniques taught herein, for each array at each logging point, a list of operating frequencies can be generated with the operating frequencies listed in ordered based on their respective quality factor. With quality factors generated for multiple operating frequencies and multiple receiver arrays at multiple logging points, these quality factors can be mapped to logging points as curves generated on a display device such as a visual display or a printer device. Moreover, this processing step can produce an indicator for formation dip information to provide dip information efficiently for conventional array induction processing, such that conventional array induction processing can be improved/modified accordingly.

The algorithms for the processing of MCI tools form a complicated system with the processing steps strongly interconnected. In other words, quality of a processing step will influence next processing steps. By being the first processing step, Radial1D/BHC processing is a crucial step. The homogeneous inversion processing method, as taught herein, provides a mechanism to examine quality of Radial1D/BHC processing. Based on the quality evaluation results, an optimal frequency channel can be selected for operation of each array of the MCI tool to achieve better processing accuracy in all subsequent processing steps. In addition, the quality evaluation results can help to diagnose possible hardware or/and calibration issues.

Conventional array induction processing needs to be corrected or improved when there is relative high dip angle between tool and formation. The formation dip angle can be estimated from the homogeneous inversion processing method. The result can be used to trigger additional correction to be conducted on conventional array induction processing.

Since computational time of homogeneous inversion processing is very fast, both applications to quantify the quality of Radial1D/BHC processing and to generate an indicator for formation dip information can be conducted in a real-time.

Figure 9:
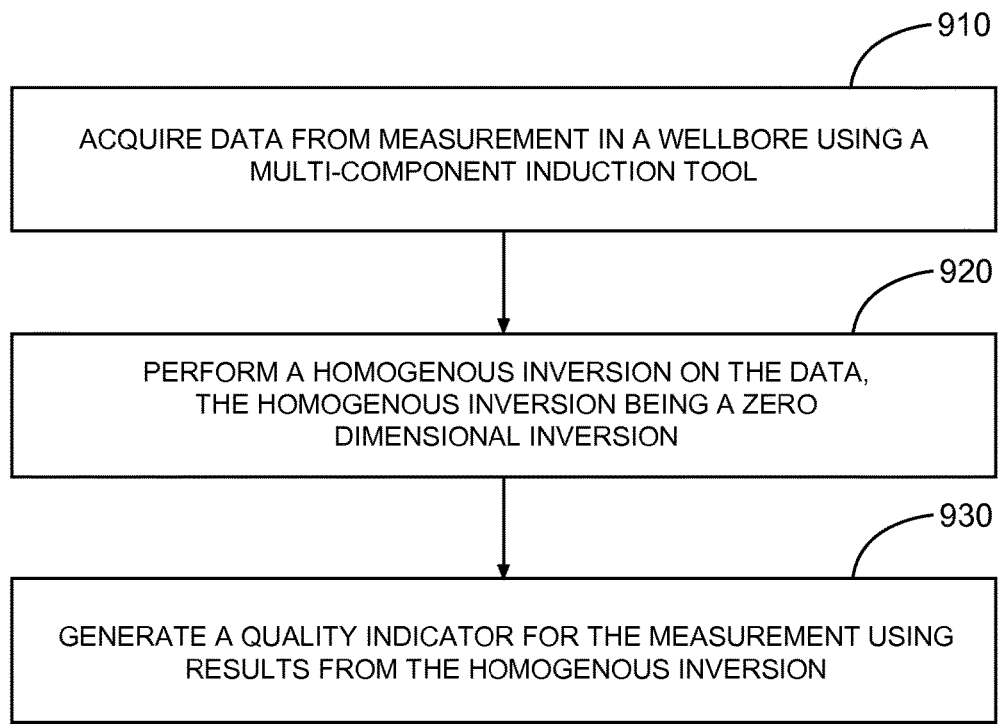
FIG. 9 shows features of an example method of operating a processor to perform operations with respect to quality of measurements and data of wellbore operations downhole, in accordance with various embodiments.

FIG. 9 shows features of an embodiment of an example method of operating a processor to perform operations with respect to quality of measurements and data of wellbore operations downhole. At 910, data from measurement in a wellbore using a MCI tool is acquired. Acquiring data using the MCI tool can include acquiring data from a plurality of receiver arrays of the MCI tool. Acquiring data using the MCI tool can include acquiring data corresponding to different frequencies of operation of the MCI tool.

At 920, a homogenous inversion is performed on the data, the homogenous inversion being a zero dimensional inversion. At 930, a quality indicator for the measurement is generated using results from the homogenous inversion.

With respect to the different data acquired, generating a quality indicator can include comparing the results from the homogenous inversion with results from a Radial1D/BHC on the data. Generating a quality indicator can include generating a quality indicator for each receiver array of the MCI tool, generating a quality indicator for each frequency of operation of the MCI tool, or generating a quality indicator for each receiver array of the MCI tool at each frequency of operation of the respective receiver array. The method can include comparing the quality indicators; selecting an optimal quality indicator from among the generated quality indicators; and transmitting to a display device an identification of the receiver array, frequency, or receiver array and frequency correlated to the selected optimal quality indicator. The method can include generating a signal indicating a problem with quality of the measurement or presence of a complex formation characteristic that deviates from the inversion model.

With respect to the different data acquired, generating a quality indicator can include setting a range limit to resistivity determined by the homogeneous inversion for a frequency of operation of the MCI tool or an array of the MCI tool. The method can include performing an iterative error analysis process by injecting noise at an input of homogenous inversion on the data in each iteration, the injected noise different in each iteration, and analyzing variations in results of the homogenous inversion of the iterations.

With respect to the different data acquired, the method can include generating a quality indicator for horizontal resistivity and vertical resistivity with respect to individual thresholds for horizontal resistivity and vertical resistivity. Generating each quality indicator can include identifying the respective quality indicator as being questionable if the generated quality indicator is greater than the respective individual threshold and uncertain if the respective resistivity is greater than a specified upper limit.

The method can include generating a quality indicator for dip with respect to a threshold for horizontal resistivity and vertical resistivity. Generating the quality indicator for dip can include identifying the respective quality indicator as being questionable if the generated quality indicator for dip is greater than the threshold and uncertain if horizontal resistivity generated by Radial1D/BHC on the data is greater than a specified upper limit, vertical resistivity generated by Radial1D/BHC on the data is greater than a specified upper limit, or ratio of vertical resistivity to horizontal resistivity generated by Radial1D/BHC on the data is less than a threshold for the ratio.

The method can include acquiring data from a plurality of receiver arrays of the MCI tool at a plurality of logging points, the acquired data including data for each receiver array operating at a plurality of different frequencies; forming a quality indicator for each receiver array at each frequency at each logging point; selecting an optimal frequency of operation for each receiver array from among the plurality of frequencies of the respective receiver array based on the quality indicator for the respective receiver array at each logging point.

The method can include determining dip by homogenous inversion on the data; identifying a high dip status if the determined dip is greater than a threshold for dip; identifying a low dip status if the determined dip is less than or equal to the threshold for dip; and modifying induction processing of the data.

In various embodiments, a non-transitory machine-readable storage device can comprise instructions stored thereon, which, when performed by a machine, cause the machine to perform operations, the operations comprising one or more features similar to or identical to features of methods and techniques described herein. The physical structure of such instructions may be operated on by one or more processors. Executing these physical structures can cause the machine to perform operations to acquire data from measurement in a wellbore using a MCI tool; to perform a homogenous inversion on the data, the homogenous inversion being a zero dimensional inversion; and to generate a quality indicator for the measurement using results from the homogenous inversion.

The instructions can include instructions to generate a quality indicator by a comparison of the results from the homogenous inversion with results from a Radial1D/BHC on the data. The instructions can include instructions to generate a quality indicator for each receiver array of the MCI tool, generating a quality indicator for each frequency of operation of the MCI tool, or generating a quality indicator for each receiver array of the MCI tool at each frequency of operation of the respective receiver array. The instructions can include instructions to compare the quality indicators; to select an optimal quality indicator from among the generated quality indicators; and to transmit to a display device an identification of the receiver array, frequency, or receiver array and frequency correlated to the selected optimal quality indicator.

The instructions can include instructions to operate a MCI tool having one or more transmitters and one or more receivers to provide data to a processing unit in accordance with the teachings herein. Further, a machine-readable storage device, herein, is a physical device that stores data represented by physical structure within the device. Examples of machine-readable storage devices can include, but are not limited to, read only memory (ROM), random access memory (RAM), a magnetic disk storage device, an optical storage device, a flash memory, and other electronic, magnetic, and/or optical memory devices.

In various embodiments, a system can comprise a tool structure and a processing unit to process data from operating the tool structure. The tool structure can be a MCI tool structure having a transmitter array and a plurality of receiver arrays, where the MCI tool structure is capable of operating in a wellbore. The MCI tool can include the plurality of receiver arrays structured with coils arranged in a plurality of receiver triads disposed axially on the MCI tool and the transmitter array structured with coils arranged in a transmitter triad disposed axially on the MCI tool, where the receiver triads are at different distances from the transmitter triad.

The processing unit can be structured to perform operations to acquire data from measurement in a wellbore using a MCI tool; to perform a homogenous inversion on the data, the homogenous inversion being a zero dimensional inversion; and to generate a quality indicator for the measurement using results from the homogenous inversion. The processing unit can be structured to generate a quality indicator by a comparison of the results from the homogenous inversion with results from a Radial1D/BHC on the data. The processing unit can be structured to generate a quality indicator for each receiver array of the MCI tool, to generate a quality indicator for each frequency of operation of the MCI tool, or to generate a quality indicator for each receiver array of the MCI tool at each frequency of operation of the respective receiver array. The processing unit can be structured to compare the quality indicators; to select an optimal quality indicator from among the generated quality indicators; and to transmit to a display device an identification of the receiver array, frequency, or receiver array and frequency correlated to the selected optimal quality indicator.

The processing unit can be structured to perform processing techniques similar to or identical to the techniques discussed herein. The processing unit may control selective activation of the transmitters and acquisition of signals from the receivers. Alternatively, a control unit can be used to control and manage the transmitters and receivers. The processing unit can be configured to process the acquired signals and process data related to or generated from the acquired signals. The processing unit may be arranged as an integrated unit or a distributed unit. The processing unit can be disposed at the surface of a wellbore to process MCI data from operating the tool structure downhole. The processing unit be disposed in a housing unit integrated with the tool structure or arranged downhole in the vicinity of the tool structure.

Figure 10:
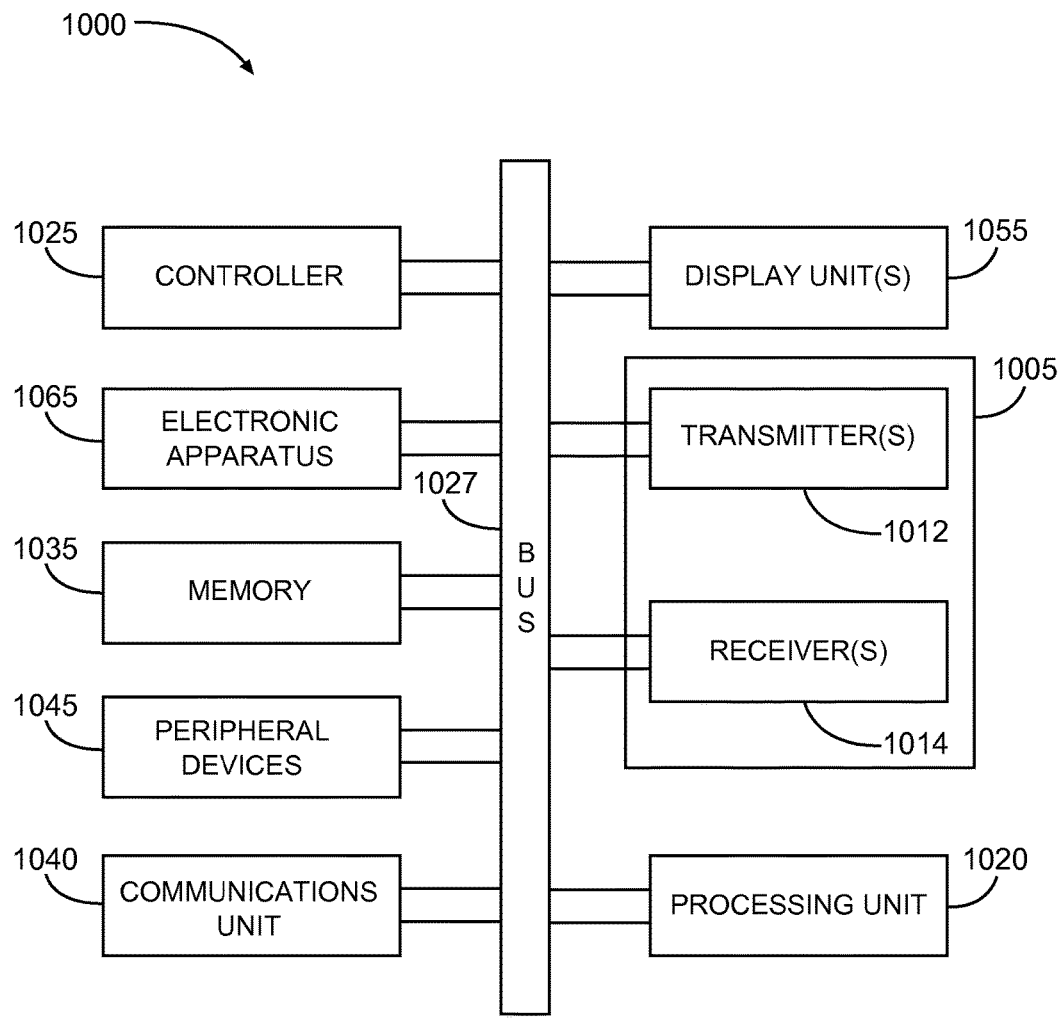
FIG. 10 depicts a block diagram of features of an example system operable to control a MCI tool to conduct measurements in a wellbore and to implement applications of homogeneous inversion, in accordance with various embodiments.

FIG. 10 depicts a block diagram of features of an embodiment of an example system 1000 operable to control a MCI tool to conduct measurements in a wellbore and to implement a homogenous inversion scheme to provide quality control with respect to data and analysis derived from operating the MCI tool. The system 1000 includes a tool structure 1005 having an arrangement of transmitter antenna(s) 1012 and receiver antenna(s) 1014 operable in a wellbore. The arrangements of the transmitter antenna(s) 1012 and the receiver antenna(s) 1014 of the tool structure 1005 can be realized similar to or identical to arrangements discussed herein. The system 1000 can also include a controller 1025, a memory 1035, an electronic apparatus 1065, and a communications unit 1040. The controller 1025 and the memory 1035 can be arranged to operate the tool structure 1005 to acquire measurement data as the tool structure 1005 is operated. The controller 1025 and the memory 1035 can be realized to control activation of selected ones of the transmitter antennas 1012 and data acquisition by selected one of the receiver antennas 1014 in the tool structure 1005 and to manage processing schemes with respect to data derivable from measurements using tool structure 1005 as described herein. Processing unit 1020 can be structured to perform the operations to manage processing schemes implementing a homogenous inversion scheme in a manner similar to or identical to embodiments described herein.

Electronic apparatus 1065 can be used in conjunction with the controller 1025 to perform tasks associated with taking measurements downhole with the transmitter antenna(s) 1014 and the receiver antenna(s) 1012 of the tool structure 1005. The communications unit 1040 can include downhole communications in a drilling operation. Such downhole communications can include a telemetry system.

The system 1000 can also include a bus 1027, where the bus 1027 provides electrical conductivity among the components of the system 1000. The bus 1027 can include an address bus, a data bus, and a control bus, each independently configured. The bus 1027 can also use common conductive lines for providing one or more of address, data, or control, the use of which can be regulated by the controller 1025. The bus 1027 can include instrumentality for a communication network. The bus 1027 can be configured such that the components of the system 1000 are distributed. Such distribution can be arranged between downhole components such as the transmitter antenna(s) 1012 and the receiver antenna(s) 1014 of the tool structure 1005 and components that can be disposed on the surface of a well. Alternatively, various of these components can be co-located such as on one or more collars of a drill string or on a wireline structure.

In various embodiments, peripheral devices 1045 can include displays, additional storage memory, and/or other control devices that may operate in conjunction with the controller 1025 and/or the memory 1035. In an embodiment, the controller 1025 can be realized as one or more processors. The peripheral devices 1045 can be arranged to operate in conjunction with display unit(s) 1055 with instructions stored in the memory 1035 to implement a user interface to manage the operation of the tool structure 1005 and/or components distributed within the system 1000. Such a user interface can be operated in conjunction with the communications unit 1040 and the bus 1027. Various components of the system 1000 can be integrated with the tool structure 1005 such that processing identical to or similar to the processing schemes discussed with respect to various embodiments herein can be performed downhole.

Figure 11:
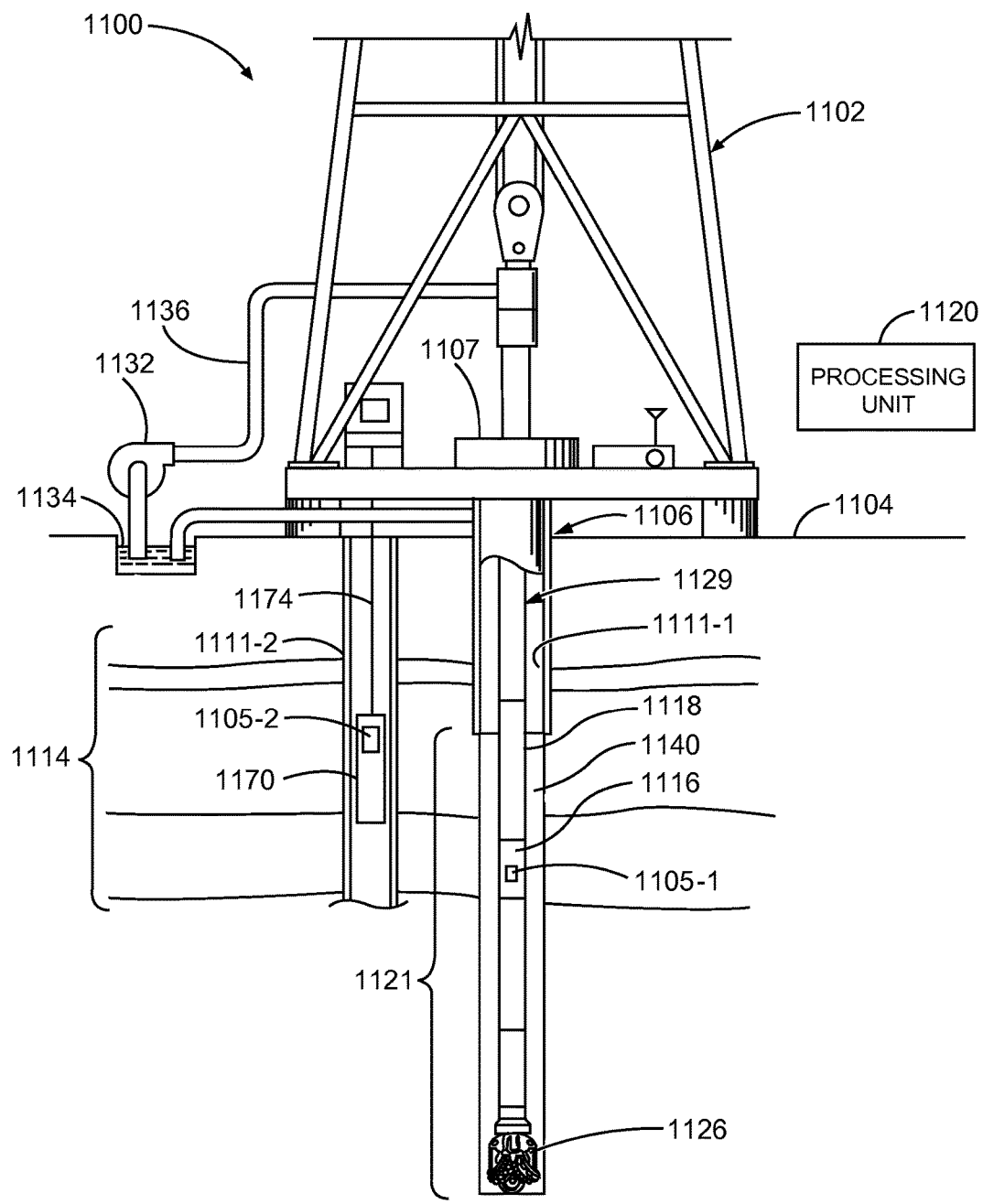
FIG. 11 depicts an example system at a drilling site, where the system is operable to control a MCI tool to conduct measurements in a wellbore and to implement applications of homogeneous inversion, in accordance with various embodiments.

FIG. 11 depicts an embodiment of a system 1100 at a drilling site, where the system 1100 includes an apparatus operable to control a MCI tool to conduct measurements in a wellbore and to implement a homogenous inversion scheme to provide quality assessment and control using data derived from operating the MCI tool. The system 1100 can include a tool 1105-1, 1105-2, or both 1105-1 and 1105-2 having an arrangement of transmitter antennas and receiver antennas operable to make measurements that can be used for a number of drilling tasks including, but not limited to, processing MCI data. The tools 1105-1 and 1105-2 can be structured identical to or similar to a tool architecture or combinations of tool architectures discussed herein, including control units and processing units operable to perform processing schemes in a manner identical to or similar to processing techniques discussed herein. The tools 1105-1, 1105-2, or both 1105-1 and 1105-2 can be distributed among the components of system 1100. The tools 1105-1 and 1105-2 can be realized in a similar or identical manner to arrangements of control units, transmitters, receivers, and processing units discussed herein. The tools 1105-1 and 805-2 can be structured and fabricated in accordance with various embodiments as taught herein.

The system 1100 can include a drilling rig 1102 located at a surface 1104 of a well 1106 and a string of drill pipes, that is, drill string 1129, connected together so as to form a drilling string that is lowered through a rotary table 1107 into a wellbore or borehole 1111-1. The drilling rig 1102 can provide support for the drill string 1129. The drill string 1129 can operate to penetrate rotary table 1107 for drilling the borehole 1111-1 through subsurface formations 1114. The drill string 1129 can include a drill pipe 1118 and a bottom hole assembly 1121 located at the lower portion of the drill pipe 1118.

The bottom hole assembly 1121 can include a drill collar 1116 and a drill bit 1126. The drill bit 1126 can operate to create the borehole 1111-1 by penetrating the surface 1104 and the subsurface formations 1114. The bottom hole assembly 1121 can include the tool 1105-1 attached to the drill collar 1116 to conduct measurements to determine formation parameters. The tool 1105-1 can be structured for an implementation as a MWD system such as a LWD system. The housing containing the tool 1105-1 can include electronics to initiate measurements from selected transmitter antennas and to collect measurement signals from selected receiver antennas. Such electronics can include a processing unit to provide an analysis of MCI data over a standard communication mechanism for operating in a well. Alternatively, electronics can include a communications interface to provide measurement signals collected by the tool 1105-1 to the surface over a standard communication mechanism for operating in a well, where these measurements signals can be analyzed at a processing unit 1120 at the surface to provide analysis of MCI data.

During drilling operations, the drill string 1129 can be rotated by the rotary table 1107. In addition to, or alternatively, the bottom hole assembly 1121 can also be rotated by a motor (e.g., a mud motor) that is located downhole. The drill collars 1116 can be used to add weight to the drill bit 1126. The drill collars 1116 also can stiffen the bottom hole assembly 1121 to allow the bottom hole assembly 1121 to transfer the added weight to the drill bit 1126, and in turn, assist the drill bit 1126 in penetrating the surface 1104 and the subsurface formations 1114.

During drilling operations, a mud pump 1132 can pump drilling fluid (sometimes known by those of skill in the art as "drilling mud") from a mud pit 1134 through a hose 1136 into the drill pipe 1118 and down to the drill bit 1126. The drilling fluid can flow out from the drill bit 1126 and be returned to the surface 1104 through an annular area 1140 between the drill pipe 1118 and the sides of the borehole 1111-1. The drilling fluid may then be returned to the mud pit 1134, where such fluid is filtered. In some embodiments, the drilling fluid can be used to cool the drill bit 1126, as well as to provide lubrication for the drill bit 1126 during drilling operations. Additionally, the drilling fluid may be used to remove subsurface formation cuttings created by operating the drill bit 1126.

In various embodiments, the tool 1105-2 may be included in a tool body 1170 coupled to a logging cable 1174 such as, for example, for wireline applications. The tool body 1170 containing the tool 1105-2 can include electronics to initiate measurements from selected transmitter antennas and to collect measurement signals from selected receiver antennas. Such electronics can include a processing unit to provide analysis of MCI data over a standard communication mechanism for operating in a well. Alternatively, electronics can include a communications interface to provide measurement signals collected by the tool 1105-2 to the surface over a standard communication mechanism for operating in a well, where these measurements signals can be analyzed at a processing unit 1120 at the surface to provide analysis of MCI data. The logging cable 1174 may be realized as a wireline (multiple power and communication lines), a mono-cable (a single conductor), and/or a slick-line (no conductors for power or communications), or other appropriate structure for use in the borehole 1111-2. Though FIG. 11 depicts both an arrangement for wireline applications and an arrangement for LWD applications, the system 1100 may be structured to provide one of the two applications.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
lowering a multi-component induction tool into a well, wherein the multi-component induction tool comprises,
a housing,
a triad of transmitter coils in the housing, wherein each of the triad of transmitter coils are non-parallel with respect to each other, and
a plurality of receiver coils, wherein the plurality of receiver coils comprises a triad of receiver coils;
activating the triad of transmitter coils at a frequency to generate an induced electromagnetic signal from a surrounding formation;
acquiring a plurality of measurements from the plurality of receiver coils, wherein the plurality of measurements comprises measurements from the triad of receiver coils, and wherein the plurality of measurements is collected from the induced electromagnetic signal;
performing a homogenous inversion based on the plurality of measurements to generate a first formation property value and performing a nonhomogeneous inversion based on the plurality of measurements to generate a second formation property value, the homogenous inversion being a zero dimensional inversion;
generating a quality metric for the plurality of measurements, wherein the quality metric is based on a comparison between the first formation property value and the second formation property value;
selecting a selected value based on the quality metric; and
determining a formation parameter based on the selected value.

2. The method of claim 1, wherein the plurality of receiver coils comprises a plurality of receiver arrays.

3. The method of claim 1, wherein acquiring the plurality of measurements comprises acquiring measurements corresponding to different frequencies of operation of the multi-component induction tool.

4. The method of claim 1, wherein the nonhomogenous inversion comprises a radial one dimensional inversion with borehole correction.

5. The method of claim 1, wherein generating the quality metric comprises setting a range limit to resistivity determined by the homogeneous inversion for a frequency of operation of the multi-component induction tool or an array of the multi-component induction tool.

6. The method of claim 1, further comprising performing an iterative error analysis process by injecting noise at an input of homogenous inversion based on the plurality of measurements in each iteration of a set of iterations, the noise different in each iteration, and analyzing variations in results of the homogenous inversion of the set of iterations.

7. The method of claim 1, wherein:
the plurality of receiver coils comprises a plurality of receiver arrays;

acquiring the plurality of measurements comprises acquiring the plurality of measurements from the plurality of receiver arrays at a plurality of logging points, the plurality of measurements comprising receiver measurements for each of the plurality of receiver arrays operating at a plurality of frequencies;

generating the quality metric comprises generating a quality metric for each of the plurality of receiver arrays at each frequency at each logging point; and selecting the selected value comprises selecting an optimal frequency of operation for each of the plurality of receiver arrays from among the plurality of frequencies based on the quality metric for each of the plurality of receiver arrays at each logging point.

8. The method of claim 1, further comprising:
determining if a dip is greater than a threshold for dip based on the first formation property value; and
modifying induction processing based on the plurality of measurements in response to the dip being greater than the threshold for dip.

9. The method of claim 1, wherein the quality metric is correlated with a first difference, wherein the first difference is a difference between the first formation property value and the second formation property value, and wherein the first difference is smaller than a second difference, wherein the second difference is a difference between a second homogeneous inversion result based on a second plurality of measurements and a second nonhomogeneous inversion result based on the second plurality of measurements.

10. The method of claim 1, further comprising displaying the formation parameter on a display device.

11. The method of claim 4, wherein:
the plurality of receiver coils comprises a plurality of receiver arrays; and
generating the quality metric comprises generating at least one quality metric for each receiver array of the plurality of receiver arrays, generating at least one of quality metric for each frequency of operation of the multi-component induction tool, or generating at least one of quality metric for each frequency of operation at each receiver array of the plurality of receiver arrays.

12. The method of claim 4, further comprising generating a signal indicating a problem with a quality of at least one of the plurality of measurements or presence of a formation characteristic that deviates from an inversion model.

13. The method of claim 4, wherein generating each quality metric comprises identifying the quality metric as being unreliable if the quality metric is greater than a threshold, or if a resistivity determined from nonhomogeneous inversion based on the plurality of measurements is greater than a resistivity limit.

14. The method of claim 4, wherein the quality metric is a quality metric for dip.

15. The method of claim 11, further comprising transmitting to a display device an identification of the receiver array, frequency, or receiver array and frequency correlated to the selected value.

16. The method of claim 14, wherein generating the quality metric for dip comprises identifying measurements used to generate the quality metric for dip as being unreliable if,
a difference between a dip generated by radial one dimensional inversion and a dip generated by homogeneous inversion is greater than a dip threshold,
a horizontal resistivity generated by radial one dimensional inversion with borehole correction based on the plurality of measurements is greater than a horizontal resistivity limit,
a vertical resistivity generated by radial one dimensional inversion with borehole correction based on the plurality of measurements is greater than a vertical resistivity limit, or
a ratio of vertical resistivity to horizontal resistivity generated by radial one dimensional inversion with borehole correction based on the plurality of measurements is less than a threshold for the ratio of vertical resistivity to horizontal resistivity.

17. A non-transitory machine-readable storage device having instructions stored thereon, which, when performed by a machine operating a processor, cause the machine to perform operations, the operations comprising:
lowering a multi-component induction tool into a well, wherein the multi-component induction tool comprises,
a housing,
a triad of transmitter coils in the housing, wherein each of the triad of transmitter coils are non-parallel with respect to each other, and
a plurality of receiver coils, wherein the plurality of receiver coils comprises a triad of receiver coils;
activating the triad of transmitter coils at a frequency to generate an induced electromagnetic signal from a surrounding formation;
acquiring a plurality of measurements from the plurality of receiver coils, wherein the plurality of measurements comprises measurements from the triad of receiver coils, and wherein the plurality of measurements is collected from the induced electromagnetic signal;
performing a homogenous inversion based on the plurality of measurements to generate a first formation property value and performing a nonhomogeneous inversion based on the plurality of measurements to generate a second formation property value, the homogenous inversion being a zero dimensional inversion;
generating a quality metric for the plurality of measurements, wherein the quality metric is based on a comparison between the first formation property value and the second formation property value;
selecting a selected value based on the quality metric; and
determining a formation parameter based on the selected value.

18. A system comprising:
a multi-component induction tool comprising
a housing,
a triad of transmitter coils in the housing, wherein each of the triad of transmitter coils are non-parallel with respect to each other, and
a plurality of receiver coils, wherein the plurality of receiver coils comprises a triad of receiver coils; and
a non-transitory machine-readable storage device having instructions that are executable by a processor to cause the processor to:
activate the triad of transmitter coils at a frequency to generate an induced electromagnetic signal from a surrounding formation;
acquire a plurality of measurements from the plurality of receiver coils, wherein the plurality of measurements comprises measurements from the triad of receiver coils, and wherein the plurality of measurements is collected from the induced electromagnetic signal;

perform a homogenous inversion based on the plurality of measurements to generate a first formation property value and perform a nonhomogeneous inversion based on the plurality of measurements to generate a second formation property value, the homogenous inversion being a zero dimensional inversion; and generate a quality metric for the plurality of measurements, wherein the quality metric is based on a comparison between the first formation property value and the second formation property value;

select a selected value based on the quality metric; and determine a formation parameter based on the selected value.

19. The system of claim 18, wherein the instructions comprise instructions to acquire measurements corresponding to different frequencies of operation of the multi-component induction tool.

20. The system of claim 18, wherein the nonhomogenous inversion comprises a radial one dimensional inversion with borehole correction.

21. The system of claim 18, wherein the instructions to generate the quality metric comprise instructions to set a range limit to resistivity determined by the homogeneous inversion for a frequency of operation of the multi-component induction tool or an array of the multi-component induction tool.

22. The system of claim 18, wherein the instructions comprise instructions to perform an iterative error analysis process by injecting noise at an input of homogenous inversion based on the plurality of measurements in each iteration of a set of iterations, the noise different in each iteration, and analysis of variations in results of the homogenous inversion of the set of iterations.

23. The system of claim 18, wherein the plurality of receiver coils comprises a plurality of receiver arrays;

instructions to acquire the plurality of measurements comprise instructions to acquire the plurality of measurements from the plurality of receiver arrays of the multi-component induction tool at a plurality of logging points, the plurality of measurements comprising receiver measurements for each of the plurality of receiver arrays operating at a plurality of frequencies;

instructions to generate the quality metric comprise instructions to generate a quality metric for each of the plurality of receiver arrays at each frequency at each logging point; and instructions to select the selected value comprise instructions to select an optimal frequency of operation for each of the plurality of receiver arrays from among the plurality of frequencies based on the quality metric for each of the plurality of receiver arrays at each logging point.

24. The system of claim 18, wherein the instructions comprise instructions to:

determine if a dip is greater than a threshold for dip based on the first formation property value; and modify induction processing based on the plurality of measurements in response to the dip being greater than the threshold for dip.

25. The system of claim 18, wherein the formation parameter is at least one of a resistivity, conductivity, formation anisotropy, dip angle, strike angle, or boundary.

26. The system of claim 20, wherein:

the plurality of receiver coils comprises a plurality of receiver arrays; and the instructions to generate the quality metric comprise instructions to generate at least one quality metric for each receiver array of the plurality of receiver arrays, generate at least one quality metric for each frequency of operation of the multi-component induction tool, or generate at least one quality metric for each frequency of operation at each receiver array.

27. The system of claim 20, wherein the instructions comprise instructions to generate a signal indicating a problem with a quality of at least one of the plurality of measurements or presence of a formation characteristic that deviates from an inversion model.

28. The system of claim 20, wherein instructions to generate each quality indicator comprises instructions to identify the quality metric as being unreliable if the quality metric is greater than a threshold, or if a resistivity determined from nonhomogeneous inversion based on the plurality of measurements is greater than a resistivity limit.

29. The system of claim 20, wherein the quality metric is a quality metric for dip.

30. The system of claim 29, wherein instructions to generate the quality metric for dip comprises instructions to identify measurements used to generate the quality metric for dip as being unreliable if, a difference between a dip generated by radial one dimensional inversion and a dip generated by homogeneous inversion is greater than a dip threshold, a horizontal resistivity generated by radial one dimensional inversion with borehole correction based on the plurality of measurements is greater than a first upper limit, a vertical resistivity generated by radial one dimensional inversion with borehole correction based on the plurality of measurements is greater than a second upper limit, or a ratio of vertical resistivity to horizontal resistivity generated by radial one dimensional inversion with borehole correction based on the plurality of measurements is less than a threshold for the ratio of vertical resistivity to horizontal resistivity.

* * * * *